R. S. SMITH.
ELECTRIC HEATED STEERING RIM.
APPLICATION FILED AUG. 14, 1912.
1,062,745.
Patented May 27, 1913.
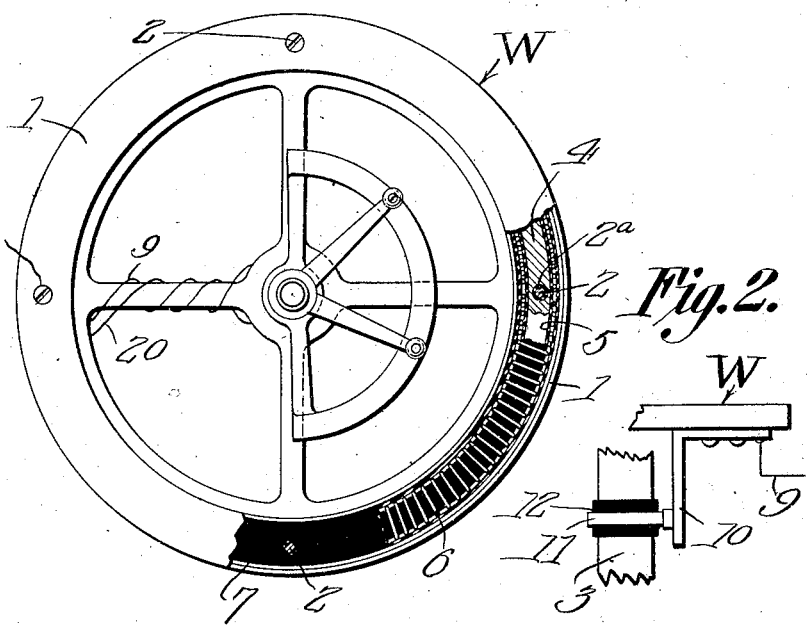
Reuben S. Smith, Inventor.

UNITED STATES PATENT OFFICE.

REUBEN S. SMITH, OF MARSHALL, TEXAS.

ELECTRIC-HEATED STEERING-RIM.

1,062,745.  Specification of Letters Patent.  Patented May 27, 1913.

Application filed August 14, 1912. Serial No. 715,098.

*To all whom it may concern:*

Be it known that I, REUBEN S. SMITH, a citizen of the United States, residing at Marshall, in the county of Harrison and State of Texas, have invented a new and useful Electric-Heated Steering-Rim, of which the following is a specification.

The device herein disclosed is an electric heating element adapted to be mounted in the steering wheel of a vehicle, for the purpose of warming the steering wheel.

The invention aims to provide a novel form of electric heating element adapted to be mounted in a steering wheel, and to provide novel means for controlling the current supply to the heating element.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 shows in plan, a steering wheel to which the present invention has been applied, parts being broken away; Fig. 2 is a fragmental elevation showing the contact between the wheel and the steering post; Fig. 3 is a transverse section on the line 3—3 of Fig. 1; and Figs. 4 and 5 are diagrams, illustrating the wiring, Fig. 5 being a modification.

The steering wheel is denoted generally by the letter W, and comprises coöperating, annular, trough-like parts 1, connected by screws 2 or like securing elements, the screws 2 being surrounded by insulating jackets 2ª. The wheel W is carried, as usual, by the steering tube or post 3.

Disposed within the wheel W is a core 4 which is fashioned from some material which will conduct heat, to the end that there may be within the wheel a member which will store heat and throw out the same for a considerable time after the current has been turned off, or should the current fail. The core 4, if desired, may be fashioned from metal. If the core 4 is fashioned from metal, the same is surrounded by an insulating jacket 5, and about the jacket 5 is placed a heating element 6 which may be of any form. Preferably, although not necessarily, the heating element 6 is in the form of a coil of wire, fashioned from German silver, or other substance having a high resistance. Surrounding the heating element 6 and insulating the same from the parts 1 of the wheel is a jacket 7.

The connecting elements 2 which hold the parts 1 of the wheel W together pass through the core 4, through the jackets 5 and 7, and through the element 6, the insulating sleeves 2ª serving to insulate the connecting elements 2 from the parts 1 of the steering wheel, from the core 4, when the same is fashioned from metal, and from the wire 1, short circuiting being thereby avoided. Obviously, the members 2 not only hold the parts 1 of the wheel W together, but also prevent the heating element, generally considered, from moving within the wheel.

One terminal of the element 6 is denoted by the numeral 8, and by means of a conductor 9, the terminal 8 is connected with an angular contact plate 10 secured to the wheel W and bearing yieldingly against a ring 11 supported by an insulating collar 12 which is secured to the tube 3. A conductor 14 leads from the ring 11 to a source of current 15, the source being, if desired, grounded, as indicated at 16. A rheostat 17 may be interposed in the conductor 14, and a switch 18 may also be interposed therein. From the other terminal 19 of the heating element 6 a conductor 20 may lead to the ground and, in the conductor 20 may be interposed a contact plate 10ª, a ring 11ª and a collar 12ª, of the sort hereinbefore described. As will be understood readily, when the switch 18 is closed, a circuit will be established through the heating element 6, the temperature of the core 4 and of the parts 1 of the steering wheel W being raised, due to the resistance of the heating element 6.

In Fig. 5, a slight modification is shown. The heating element appears in Fig. 5, the same having end terminals 21 and 22. Interposed in the heating element are intermediate terminals 23, 23ª, and 23ᵇ, dividing the heating element into segments 24, 25, 26 and 27. From the intermediate terminal 23 a conductor 28 leads to a contact terminal 29. From the intermediate terminal 23ª, a conductor 30 leads to another contact terminal 31. From the intermediate terminal 23ᵇ, a conductor 32 leads to a contact terminal 33. From one end terminal 22, a conductor 34 leads to a contact terminal 35. From the end terminal 21, a conductor 36 leads to a source of current supply 37, and from the source of current supply 37, a conductor 38 leads to a switch blade 39, adapted to move over the contact terminals 29, 31, 33 and 35. When the switch blade 39 rests upon the contact terminal 29, the current will flow through the segment 24 only. When the switch blade 39 rests upon the terminal 31, current will flow through the segments 24 and 25. When the switch blade 39 rests upon the terminal 33, current will flow through the segments 26, 25 and 24. When the switch blade 39 rests upon the terminal 35, current will flow through the segments 27, 26, 25 and 24, the circuits, in all of the cases above mentioned, being completed through the end terminal 21 and the conductor 36.

It will be clear from the foregoing description of Fig. 5 that it lies within the power of the operator to throw in one or more of the segments of the heating element, thereby regulating the temperature. The switches and the rheostat may be located at any suitable or convenient points within easy reach of the operator.

Having thus described the invention, what is claimed is:—

1. An electric heater of the class described, comprising a pair of annular, trough-like members; a heat-conducting core therein; a resistance element surrounding the core; and securing elements connecting the trough-like members and extended through the core and through the resistance element.

2. An electric heater of the class described, comprising a pair of annular, trough-like members; a metallic core therein; an insulating jacket surrounding the core; a resistance element surrounding the jacket; an insulating jacket surrounding the resistance element; a securing element connecting the trough-like members and extended through both jackets, through the resistance element and through the core; and an insulating member surrounding the securing element to space the same electrically from the trough-like members, and from the core.

In testimony that I claim the foregoing as my own, I have hereto affixed my signature in the presence of two witnesses.

REUBEN S. SMITH.

Witnesses:
  V. Z. RAINS,
  HOWARD HAMILTON.